US009462641B2

(12) United States Patent
Akers

(10) Patent No.: US 9,462,641 B2
(45) Date of Patent: Oct. 4, 2016

(54) TRANSVERSE FLUX STRIP HEATING WITH DC EDGE SATURATION

(71) Applicant: Ajax Tocco Magnethermic Corporation, Warren, OH (US)

(72) Inventor: Ronald R. Akers, Guntersville, AL (US)

(73) Assignee: Ajax Tocco Magnethermic Corporation, Warren, OH (US)

( * ) Notice: Subject to any disclaimer, the term of this patent is extended or adjusted under 35 U.S.C. 154(b) by 0 days.

(21) Appl. No.: 14/681,487

(22) Filed: Apr. 8, 2015

(65) Prior Publication Data

US 2015/0257207 A1 Sep. 10, 2015

Related U.S. Application Data

(63) Continuation of application No. PCT/US2014/062496, filed on Oct. 28, 2014.

(60) Provisional application No. 61/919,380, filed on Dec. 20, 2013.

(51) Int. Cl.
*H05B 6/36* (2006.01)
*C21D 9/60* (2006.01)
*H05B 6/06* (2006.01)
*H05B 6/10* (2006.01)
*C21D 11/00* (2006.01)
*C21D 1/42* (2006.01)

(52) U.S. Cl.
CPC ........ *H05B 6/36* (2013.01); *C21D 1/42* (2013.01); *C21D 9/60* (2013.01); *C21D 11/00* (2013.01); *H05B 6/06* (2013.01); *H05B 6/101* (2013.01); *Y02P 10/253* (2015.11)

(58) Field of Classification Search
CPC .......... C21D 11/00; C21D 9/60; C21D 1/42; Y02P 10/253; H05B 6/365; H05B 6/104; H05B 6/40
USPC ................ 219/645, 660–667, 670–673, 675
See application file for complete search history.

(56) References Cited

U.S. PATENT DOCUMENTS

| 2,836,694 A | 5/1958 | Emerson |
| 4,054,770 A | 10/1977 | Jackson et al. |
| 4,678,883 A | 7/1987 | Saitoh et al. |

(Continued)

FOREIGN PATENT DOCUMENTS

| WO | WO96/26296 | 8/1996 |
| WO | WO2014/088423 A1 | 6/2014 |

OTHER PUBLICATIONS

International Search Report and Written Opinion, PCT/US14/62496, completed Jan. 8, 2015; mailed Jan. 22, 2015, Completed Jan. 8, 2015, 9 pgs.

*Primary Examiner* — Dana Ross
*Assistant Examiner* — James Sims, III
(74) *Attorney, Agent, or Firm* — Fay Sharpe LLP

(57) ABSTRACT

Induction heating apparatus and methods are disclosed for selective workpiece heating such as strip heating, in which DC windings around one or more laminations proximate to a workpiece edge are selectively energized using DC electrical power for controlled partial or full saturation of the one laminations to control edge overheating in a transverse flux induction heating system, in which certain implementations further employ a copper shield between the induction heating coil and the strip workpiece proximate the edge of the workpiece to control the edge heating effect.

16 Claims, 6 Drawing Sheets

(56) References Cited

U.S. PATENT DOCUMENTS

| | | |
|---|---|---|
| 5,403,994 A | 4/1995 | Havas et al. |
| 5,844,213 A | 12/1998 | Peysakhovich et al. |
| 6,498,328 B2 | 12/2002 | Anderhuber et al. |
| 6,570,141 B2 | 5/2003 | Ross |
| 6,677,561 B1 | 1/2004 | Koppinen et al. |
| 6,963,056 B1 | 11/2005 | Peysakhovich et al. |
| 2002/0121512 A1 | 9/2002 | Thorpe et al. |
| 2006/0255029 A1 | 11/2006 | Bone, Jr. |
| 2007/0235446 A1* | 10/2007 | Cao ................. H05B 6/104 219/645 |
| 2009/0255924 A1 | 10/2009 | Lovens |
| 2011/0036831 A1 | 2/2011 | Warner et al. |
| 2011/0259876 A1* | 10/2011 | Breznak ............ B23K 1/0018 219/615 |

\* cited by examiner

TRANSVERSE FLUX STRIP HEATING WITH DC EDGE SATURATION

REFERENCE TO RELATED APPLICATIONS

This application is a continuation of, and claims priority to and the benefit of, International Application No PCT/US2014/062496, filed Oct. 28, 2014 and entitled "TRANSVERSE FLUX STRIP HEATING WITH DC EDGE SATURATION", and which claims priority to, and the benefit of, U.S. Provisional Patent Application Ser. No. 61/919,380, filed on Dec. 20, 2013, entitled TRANSVERSE FLUX STRIP HEATING WITH DC EDGE SATURATION, the entireties of which applications are hereby incorporated by reference.

FIELD OF THE INVENTION

The present disclosure relates generally to the induction heating workpieces and more particularly to transverse flux induction heating apparatus with field cancellation for induction heating strip work pieces.

BACKGROUND

Induction heaters are often required to heat a defined bandwidth on a plate of varying thicknesses for bending the plate. In general, the heating of a strip or plate can be for annealing purposes, such as transformer steels, paint curing, tin reflow, bonding zinc and sink/aluminum alloys to the strip for control of corrosion in a galvannealing process such as for automotive body panels, etc. In the past, a solenoid type induction coil was formed around the plate in close proximity to the portion of the plate to be heated. However, solenoid type induction heating of plate workpieces suffers from several drawbacks. In particular, for thin plate workpieces, high induction frequencies are required to effectively couple to the plate. High frequency operation, however, may lead to overheating of edge portions and/or the surface of the plate workpiece before the core of the plate can get to temperature. Alternatively, transverse coil arrangements have been contemplated, in which the induction heating coil does not encircle the workpiece. These approaches have thusfar also suffered from edge overheating, and accordingly have not been widely adopted. Thus, there remains a continuing need for improved induction heating techniques for heating select portions of plate or strip type workpieces.

SUMMARY

One or more aspects of the disclosure are now summarized to facilitate a basic understanding of the disclosure, wherein this summary is not an extensive overview of the disclosure, and is intended neither to identify certain elements of the disclosure, nor to delineate the scope thereof. The primary purpose of the summary, rather, is to present some concepts of the disclosure in a simplified form prior to the more detailed description that is presented hereinafter.

The present disclosure relates to induction heating apparatus and finds particular utility in association with plate or strip type workpieces to be heated, in which means are provided for controlling the induced currents of induction heating coils including resolving the edge overheating problem with transverse flux induction heating coils.

BRIEF DESCRIPTION OF THE DRAWINGS

The following description and drawings set forth certain illustrative implementations of the disclosure in detail, which are indicative of several exemplary ways in which the principles of the disclosure may be carried out. The illustrated examples, however, are not exhaustive of the many possible embodiments of the disclosure. Other objects, advantages and novel features of the disclosure will be appreciated from the following detailed description of the disclosure when considered in conjunction with the drawings, in which.

DETAILED DESCRIPTION

Figure 1:
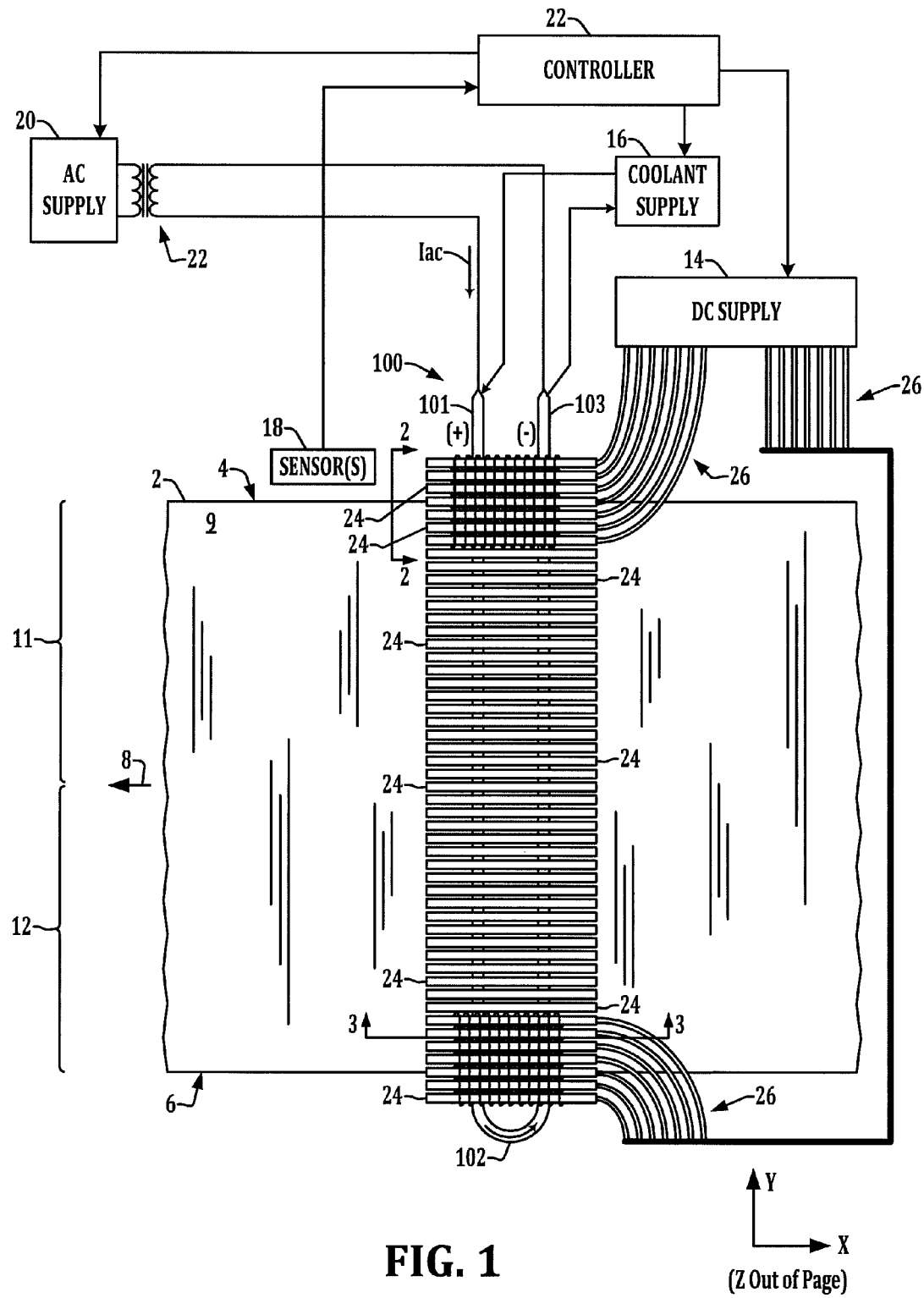
FIG. 1 is a top plan view illustrating an exemplary transverse flux induction heating system for heating strip workpieces with an induction heating coil and DC controlled saturation apparatus for mitigating edge overheating in accordance with one or more aspects of the present disclosure.

Referring now to the figures, several embodiments or implementations are hereinafter described in conjunction with the drawings, where like reference numerals are used to refer to like elements throughout, and where the various features are not necessarily drawn to scale. The present disclosure provides induction heating apparatus for heating high aspect ratio strip, plate or slab type workpieces while mitigating or avoiding edge overheating.

Transverse Flux Induction Heating (TFIH) involves applying the flux transverse to the strip to be heated, the induced current then flows in the plane of the strip. The problem is created as the current flows to the edge of the strip in the process of reversing direction resulting in the overheating of the edge of the strip. This problem has been solved by several approaches. One approach uses coils of precise width with respect to the strip width. One solution is to manufacture a coil of the precise width with respect to the strip width such that the current starts to reverse direction prior to reaching the edge, with the proper relationship an acceptable temperature differential can be generated. This also requires that the strip tracks precisely in a constant relationship to the coil and that a coil set be designed for every strip width that is to be produced. This is not commercially feasible.

Another approach uses flux shields, but while technically feasible, is generally not commercially feasible, requiring mechanical motions to track the edge of the strip and to adjust for strip width. Additionally the flux shields will have both electrical and thermal losses. Both magnetic shunts and copper conductors have been attempted for edge shielding.

A further approach uses a so-called "J Coil" which is adjustable for strip width and can be servo controlled to track the strip position. It is the only technically successful coil to date. Unfortunately, the servo controls and mechanical mechanisms make this approach cost prohibitive and the hardware is not feasible for many environments.

Split return coil configurations can be used to reduce the edge currents and therefore reduce edge overheating for induction heating of strip workpieces. These approaches have substantial promise but still require the current to reverse at the edges.

In accordance with one or more aspects of the present disclosure, the current distribution, and hence the heating, in the strip is controlled, especially approaching the edge of strip workpieces, with a DC excitation field that saturates or partially saturates selected laminations or groups of laminations where it is desirous to reduce the current in the strip. This can be accomplished in certain implementations using techniques such as those employed in a saturable-core reactor where a DC excitation coil is used to control a larger AC field by saturating a portion or all of the transformer core.

Figure 2:
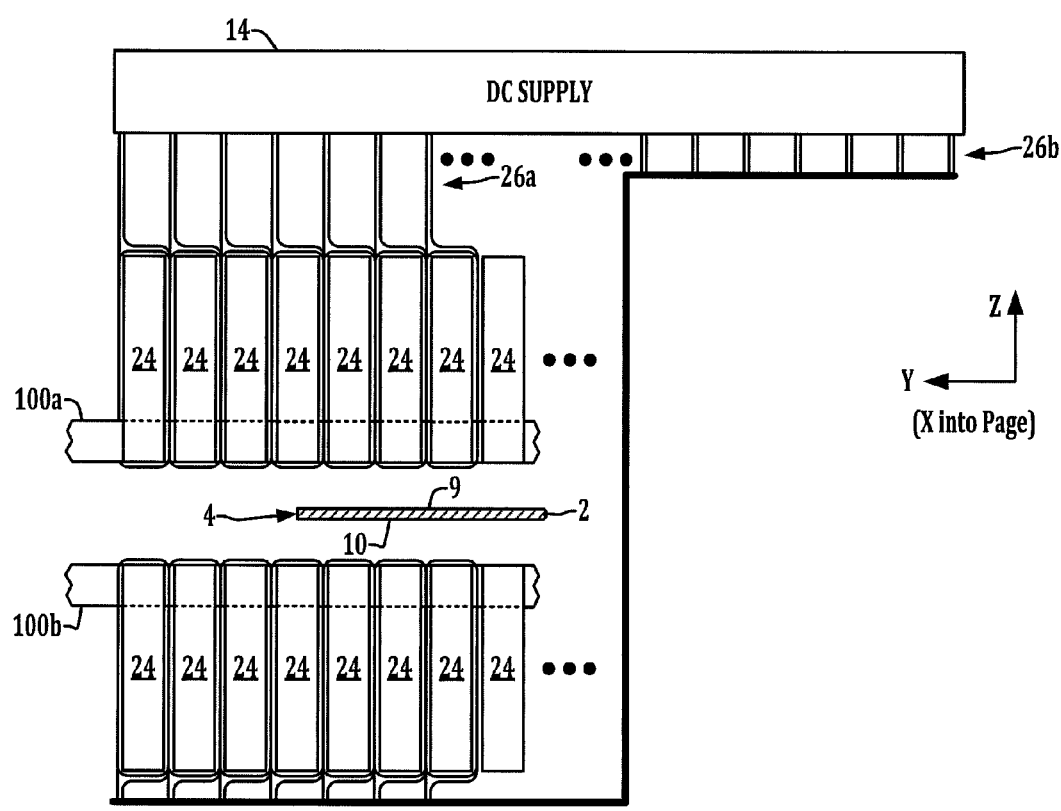
FIG. 2 is a partial sectional end elevation view taken along line 2-2 in FIG. 1 illustrating wound laminations partially encompassing top and bottom induction heating coils proximate a side edge of the heated strip workpiece for selective DC energization and corresponding magnetic field saturation proximate the workpiece edge.
Figure 3:
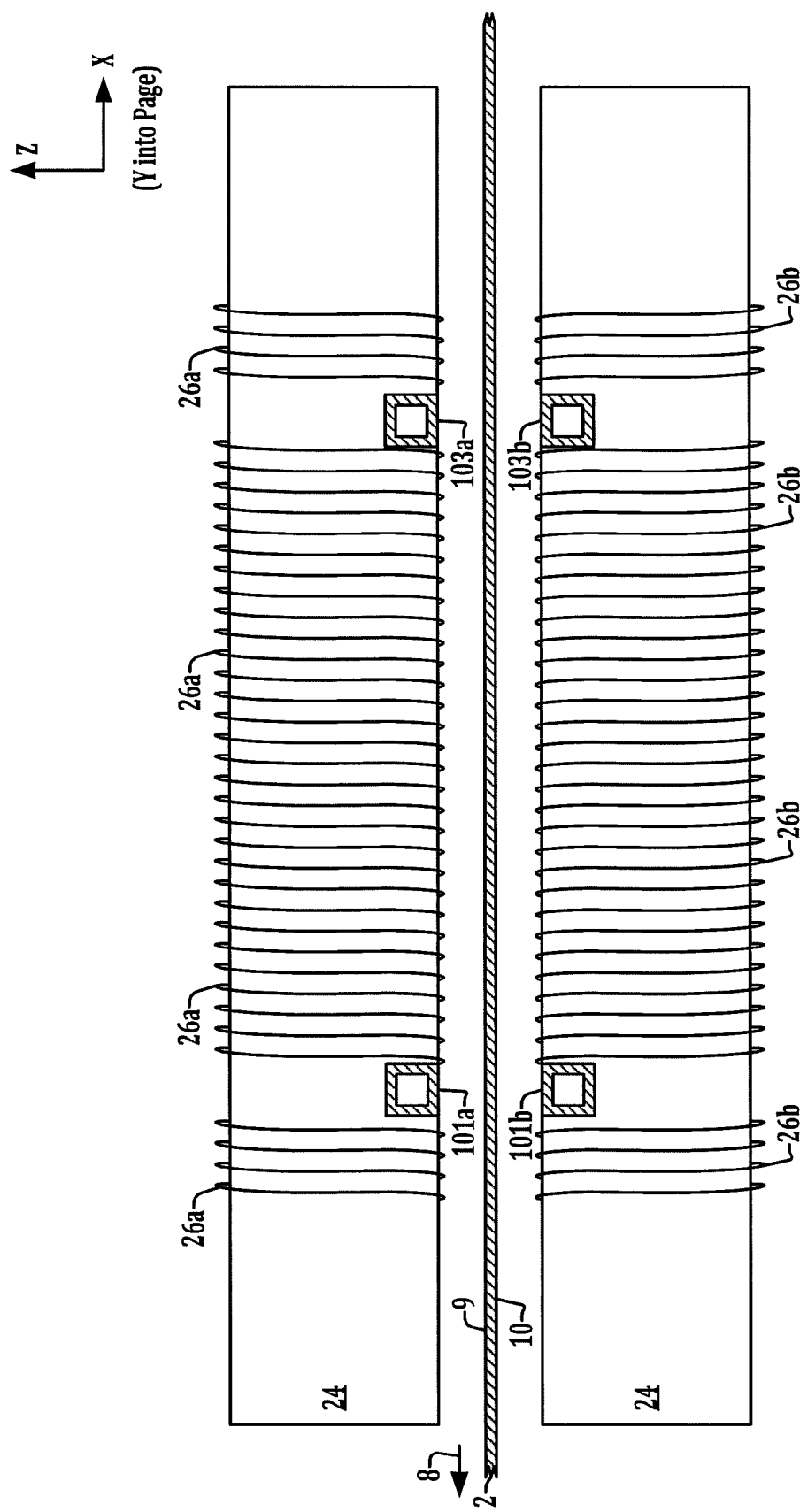
FIG. 3 is a partial sectional side elevation view taken along line 3-3 in FIG. 1 illustrating exemplary upper and lower wound laminations for selective DC energization and two legs of the top and bottom induction heating coil.

Referring initially to FIGS. 1-3, an induction heating apparatus is illustrated for induction heating of a select portion of a workpiece 2 which may be stationary or which may be moving along a process direction 8 (-X direction) during induction heating processing. The apparatus finds particular utility in heating portions of workpieces 2 having a generally flat, high aspect ratio cross-section, such as strips or plates of metallic material. For instance, in FIG. 1, the workpiece 2 is a metal plate or strip having a length along the process direction 8 (ends of the workpiece 2 not shown) and a width (along the Y direction in the figures) between an upper edge 4 and a lower edge 6, with a thickness (out of the page) that is much smaller than the width, whereby the cross-section of the workpiece material 2 has a very high aspect ratio (the width/thickness). The workpiece 2 includes first and second opposite sides 9 and 10, where the first or top side 9 is shown in FIG. 1. In certain applications, the apparatus is used to heat a portion (e.g., bandwidth) of the workpiece 2 prior to the workpiece being bent in the heated area. The use of one or more conventional solenoid type coils extending around the workpiece 2 can heat a select portion of the workpiece 2, but this approach typically leads to overheating of the edge portions near the workpiece edges 4 and 6. Prior to the present disclosure, moreover, the use of transverse flux induction heating techniques was also prone to edge overheating.

The apparatus of FIGS. 1-3 provides a novel transverse flux induction approach in which one or more coils are used for selective heating of the workpiece 2, while reducing or mitigating the adverse effects of workpiece edge overheating. In particular, the apparatus includes a coil structure 100b disposed beneath the bottom side 10 of the workpiece 2 ("behind" the workpiece 2 in FIG. 1), along with an upper induction heating coil structure 100a on top of or above the top side 9 of the workpiece 2. In this regard, the first coil structure 100a is proximate (e.g., facing) the first or top side 9 of the workpiece 2 and the second coil structure 100b is proximate (e.g., facing) the second or lower workpiece side 10, where the coil structures 100 do not touch the workpiece 2, but instead are spaced therefrom (e.g., as shown in FIGS. 2 and 3). The coils 100 in this example provide a single turn, but multiple turn embodiments are contemplated as falling within the scope of the present disclosure. As seen in FIG. 1, moreover, the each coil 100 includes a first straight portion 101, a turn portion 102, and a return straight portion 103, with the sections 101 and 103 being generally straight (although other shapes may be used), with the straight sections 101 and 103 being preferably generally transverse to the process direction 8. The coil sections 101 and 103 of the first coil structure 100a extend between (and possibly beyond) the top and bottom edges 4, 6 of the workpiece 2 along the first side 9 (above the workpiece 2 as seen in FIGS. 1 and 2), and the bottom coil 100b extends in similar fashion beneath the second side 10 of the workpiece 2. In certain implementations, the coil structures 100 are formed from a hollow copper tubing having a generally rectangular profile of approximately 1.0"×1.0"×0.15, although this example is non-limiting.

As seen in FIG. 1, an AC power supply 20 provides a single phase output to an isolation transformer 22, and one secondary terminal of the transformer 22 is coupled with the first end section 101 of the serpentine coil structure 100a, with the second transformer output coupled to the return section 103 of the coil 100, with similar AC connections to the lower coil structure 100b. In addition, the induction heating apparatus in certain embodiments includes a coolant system 16 to provide flow of liquid coolant within the interior of the coil structures 100.

Laminations 24 are provided, partially surrounding the straight portions 101 and 103 of the coil structures 100, some of which have windings 26 extending around at least portions of the individual laminations 24, and the windings are connected in the illustrated implementation to individually controllable DC outputs of a DC supply 14 (FIG. 1), and a controller 22 controls operation of the AC supply 20, the DC supply 14, and optionally may alter operation of the coolant supply system 16 in certain embodiments. In addition, the controller 22 may receive one or more signals from corresponding sensors 18, such as to sense the positions of the edges 4 and/or 6 of the workpiece 2, and may optionally include temperature sensors, or other sensors providing feedback information for operation of the induction heating system.

The illustrated system advantageously provides windings 26 around certain of the laminations 24, and energizing specific windings with DC power via the supply 14 advantageously operates to provide a continuously variable saturation effect on the magnetic field proximate the heated portions of the laminations 24, thereby reducing the AC field strength provided by the induction heating coils 100 in those areas. This, in turn, facilitates control over current crowding at the edge regions of the workpiece 2, and thus provides effective control over the amount of heating at or near the workpiece edges 4, 6.

The inventor has appreciated that the efficiency of a transverse flux coil 100 is facilitated in certain respects by use of laminations 24. Thus, although the current will still be present in the copper turn, there is very little heating without the laminations 24 being present. Moreover, the inventor has appreciated that fully or partially saturating the laminations 24 makes the induction heating system in the saturated region substantially an air core at that location, and the current and power induced in the strip workpiece 2 will be reduced sufficiently to allow the current to reverse in the strip at the edge 4, 6 or other desirous locations in the strip 2.

In the illustrated embodiments, this is implemented by locating the saturating excitation coil 26 behind the turn 101, 103 and saturating the main loop or by saturating the legs of the laminations 24. Studies have shown that both are effective. A second method would be to have laminations 24 of various lengths so there is a gradual saturation of the longer laminations similar to a "flying choke".

Lamination groups 24 can be selected so that the excitation could adjust for strip width or, by controlling both edges, adjust for strip position. It would seem to be beneficial to have different copper turns with different lamination saturation group positions, this would smooth out any non uniformity caused by the space occupied by the excitation coil 26. It is visualized that 3 turns 26 would be a good minimum but more would improve the uniformity. This is not to say that the technique could not be used on a single turn or any number of turns.

A variant implementation would be to use this technique to adjust the effective length or pattern length of single shot inductors. Much ado and many patents have been issued for mechanically or electrically adjusted single shot inductors, and the presently disclosed techniques could be used for any application that utilizes saturable magnetic materials and where it is desirous to change the field pattern and therefore the heat pattern. It could be used on a single shot coil that is used for both hardening and tempering, and pattern adjustments are desirous between the two processes. It could also be used for pattern adjustments on an encircling coil (not shown).

Figure 4:
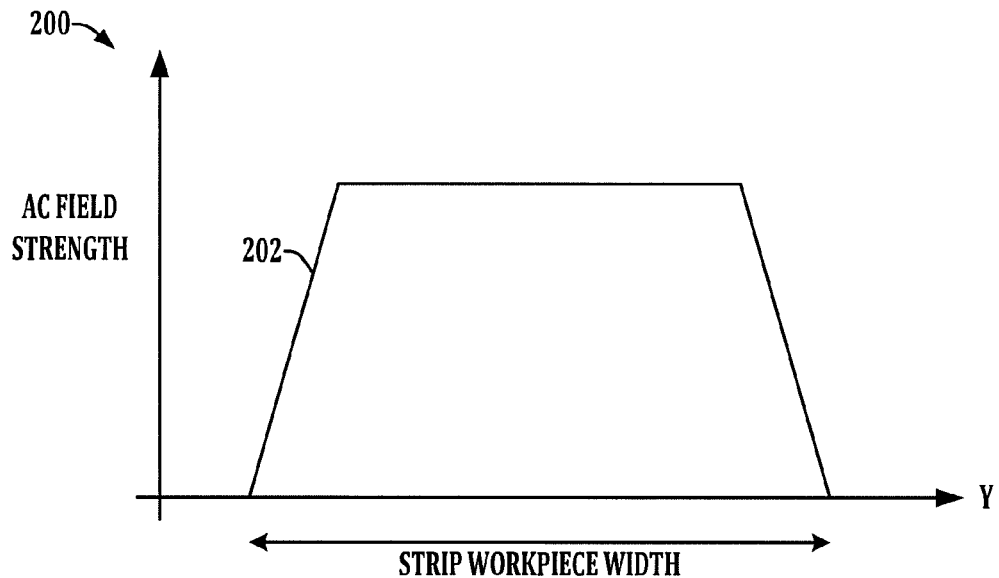
FIG. 4 is a graph illustrating an exemplary AC field strength curve along the width of the strip workpiece.
Figure 5:
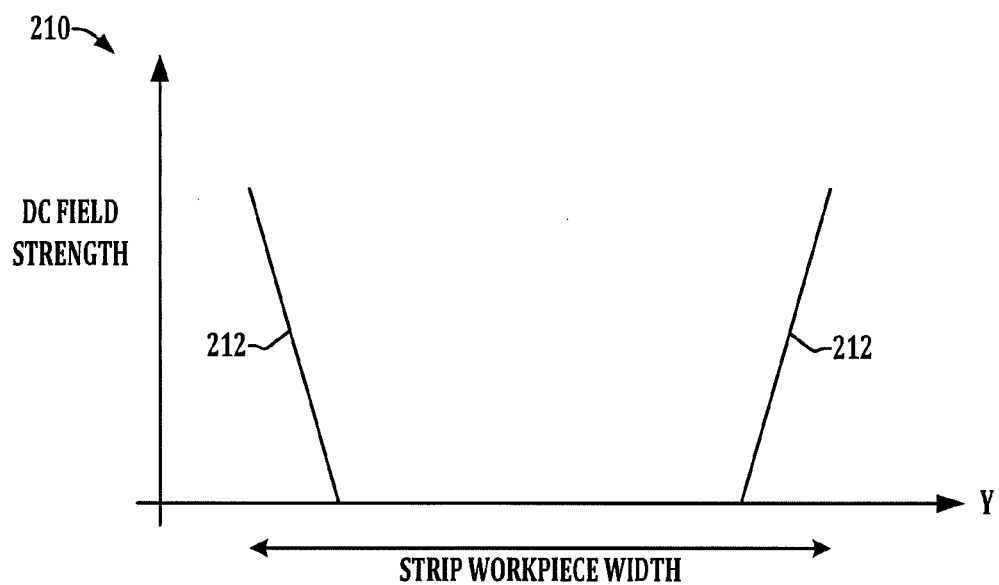
FIG. 5 is a graph illustrating an exemplary DC field strength curve along the width of the strip workpiece.

It is contemplated that the degree of saturation, i.e. the excitation field required, will be a function of a number of variables: power level (AC field strength present), frequency, strip magnetic and electrical properties, strip width, strip speed (power level), strip temperature, strip thickness or side to side thickness variation etc. FIG. 4 illustrates a graph 200 showing an AC field strength curve 202 provided by operation of the induction coils 100 along the width of the strip workpiece 2, and a graph 210 in FIG. 5 shows a corresponding DC field strength curve 212, wherein the AC field strength 202 is modified by the strength of the DC field 212 through operation of the DC power supply 14 under control of the controller 22, wherein the illustrated example provides for DC field saturation at select portions proximate the workpiece edges 4, 6 thereby reducing the AC field strength 202 in those areas. This illustrated implementation therefore facilitates reduction or elimination of strip workpiece edge overheating in the transverse flux induction heating system.

This technique could be implemented in the controller 22 with algorithms accounting for the variables or with a self-learning control method. The models could possibly be generated from FEA or other analytical models etc.

Strip width and/or location monitoring could be with laser, optical or mechanical means, with the controller 22 receiving inputs from such sensors 18.

However due to the number of variables and the constantly changing parameters, for example as a line comes up to speed, one possible embodiment employs a thermal imaging camera, or other temperature monitoring technique via one or more sensors 18, at the exit of the coil as the workpiece 2 moves along the process direction 8, or at one or several locations within the heat zone, with PID loops or other control schemes implemented by the controller 22 in order to control the uniform strip temperature automatically by feeding back the temperature or temperature differential to control the local excitation currents of the weld laminations 24 and therefore the degree of saturation, and therefore the local transverse power distribution generated in the strip workpiece 2, dynamically and continuously.

One important advantage of the disclosed concepts is that all mechanical motions, servo controls and undesirable mechanisms can be eliminated. The feedback and control can be much more dynamic and respond instantly to heating or strip (or loads of any type) variables; such as: transverse movement, start up speeds, thickness and or width changes etc. The excitation coils 26 in certain implementations are located within the heating coil and can be made to withstand any environment that the coil would withstand.

The grouping of saturable laminations 24 can be adjusted, it is contemplated that groups could be ¼" wide or smaller or several inches, for example 2" to 6" or more.

If there is a series of turns in the coils 26 or a series of coils 26 it is possible that only a portion of the turns (coils) 26 would need to be controlled to minimize the costs and complexity and localize the control.

This technique can be utilized with a conventional transverse flux coils 100, with the J coil concept or with the split return concept. It is not limited in its application.

Figure 6:
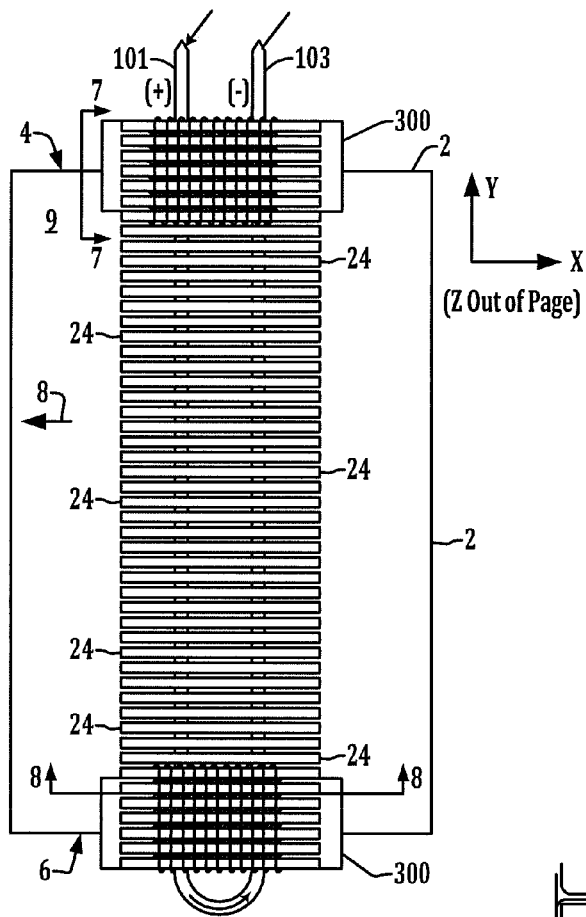
FIG. 6 is a partial top plan view illustrating another embodiment of the transverse flux induction heating system including copper shields situated partially between the workpiece and the upper and lower laminations proximate laterally opposite workpiece edges.
Figure 7:
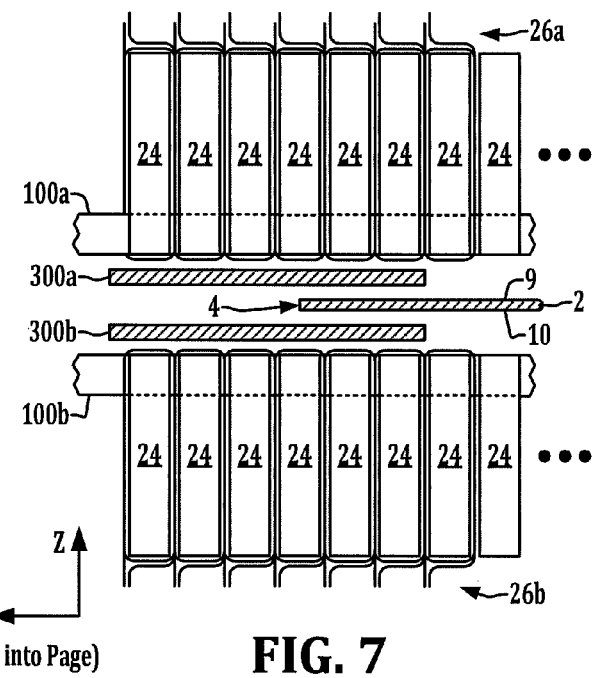
FIG. 7 is a partial sectional end elevation view taken along line 7-7 in FIG. 6 illustrating further details of the upper and lower copper shields at one lateral edge of the strip workpiece.
Figure 8:
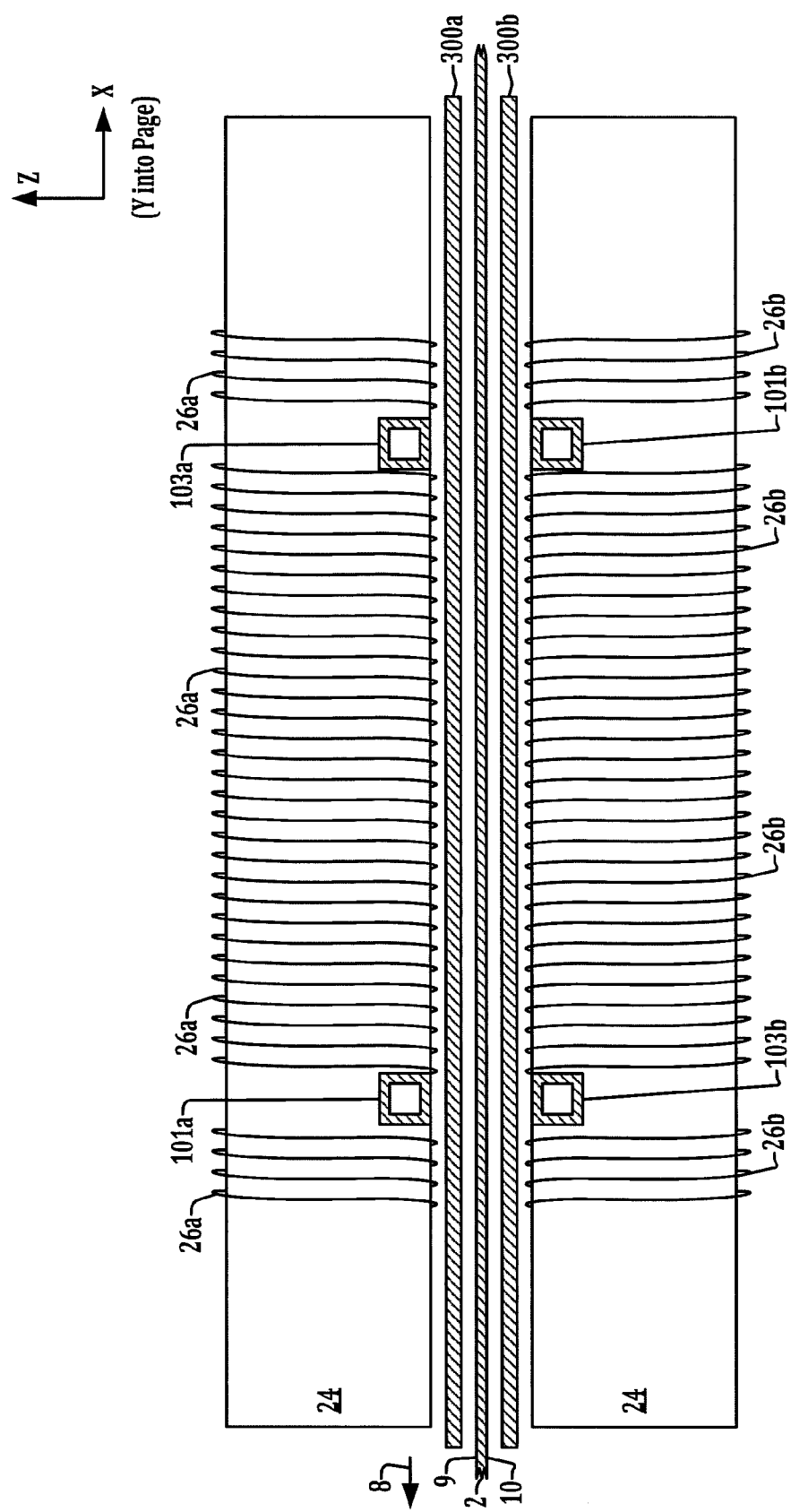
FIG. 8 is a partial sectional side elevation view taken along line 8-8 in FIG. 6 further illustrating the upper and lower copper shields and wound laminations.

Certain embodiments shown in FIGS. 6-8 further include a copper flux shield 300 between the coil 100 and the strip workpiece 2, preferably proximate the edges 4, 6 of the strip workpiece 2, to provide further control over the edge heating effect.

In operation, the controller 22 directs the DC supply 14 to selectively actuate and provide controlled DC currents to the individual windings 26 for controlling the amount of saturation on an individual basis, or in groups, and this selective DC energization can be modified according to process variations for heating workpieces 2 of different lateral widths, and different energization can be performed with respect to one side of the workpiece 11 compared to that of the other side 12 (e.g., FIG. 1). In this manner, different saturation can be provided proximate the first lateral edge 4 than is provided with respect to the other edge 6.

As further shown in FIGS. 2 and 7, moreover, the windings 26 may include multiple turns around individual ones of the laminations 24, and the number of turns and positioning of the turns of the windings 26 may be varied. As shown in FIGS. 1 and 6, the process-direction extent of the windings 26 may be varied, for example, with the windings 26 being wound around the laminations 24 only near the midpoints of the laminations 24 or only proximate the positioning of the induction heating coil sections 101, 103, with the windings 26 not being required to extend along the entire process-direction extent of the laminations 24 in certain embodiments. Moreover, copper cooling plates may be provided between adjacent laminations 24 for isolation, for example, to prevent or mitigate leakage flux between stacks of laminations 24.

As seen in FIG. 7, moreover, the shields 300 in certain embodiments may extend at least partially between one or more of the laminations and the workpiece 2, and may extend inward beyond the last wound lamination 24 in certain embodiments. Furthermore, the shields 300 may be fashioned of copper or other suitable material, and are preferably thicker than the skin depth of the material to provide magnetic shielding so as to further tailor the magnitude of the AC magnetic field at certain edge portions of the workpiece 2, and hence to control edge heating of the workpiece 2.

The invention claimed is:

1. An induction heating apparatus for induction heating at least a portion of a select portion of a strip workpiece traveling along a process direction relative to the induction heating apparatus, the workpiece having opposite first and second workpiece sides and first and second workpiece edges, the induction heating apparatus comprising:
- a first coil structure spaced from and facing the first workpiece side and extending between the first and second workpiece edges;
- an AC supply operatively coupled with the first coil structure to provide AC current to energize the first coil structure for heating at least a portion of the first workpiece side;
- a plurality of laminations at least partially surrounding a first portion of the first coil structure leaving an unobstructed second portion of the first coil structure facing the first workpiece side, the individual laminations including laminated structures extending along the process direction, the individual laminations parallel to and spaced from an adjacent lamination along a cross-process direction between the first and second workpiece edges;
- windings extending around at least portions of a first set of the plurality of laminations; and
- a DC supply coupled with the windings and operative to selectively provide DC current to individual windings to at least partially saturate a magnetic field associated with individual ones of the corresponding laminations of the first set; and
- a controller operatively coupled with the DC supply to control individual DC excitation of the individual windings for selectively saturating the individual ones of the corresponding laminations of the first set to control induction heating of the first and second workpiece edges.

2. The induction heating apparatus of claim 1, comprising:
- a flux shield spaced from and disposed between the first coil structure and the first workpiece side facing at least one of the first and second workpiece edges.

3. The induction heating apparatus of claim 2, wherein the flux shield faces at least one of the first set of the plurality of laminations.

4. The induction heating apparatus of claim 1, comprising at least one sensor located proximate at least one of the first and second workpiece edges and operative to sense heating of the workpiece.

5. The induction heating apparatus of claim 4, wherein the at least one sensor provides a signal to the controller, and wherein the controller regulates a heating condition of the workpiece by selectively adjusting the individual DC excitation of the individual windings at least partially according to the signal from the at least one sensor.

6. The induction heating apparatus of claim 1, wherein the first set of the plurality of laminations includes at least two laminations facing the first workpiece edge and at least two laminations facing the second workpiece edge.

7. The induction heating apparatus of claim 1, wherein the first coil structure forms a single turn facing the first workpiece side, the first coil structure comprising:
- a first straight portion facing the first workpiece side and extending between the first and second workpiece edges;
- a turn portion connected to the first straight portion; and
- a second straight portion connected to the turn portion, the second straight portion facing the first workpiece side and extending between the first and second workpiece edges.

8. The induction heating apparatus of claim 1, wherein the first coil structure and the plurality of laminations are integrated.

9. The induction heating apparatus of claim 1, wherein the first coil structure comprises a hollow copper tubing, the system further comprising a coolant supply operatively coupled to circulate a coolant fluid through the first coil structure.

10. An induction heating apparatus for induction heating at least a portion of a select portion of a strip workpiece traveling along a process direction relative to the induction heating apparatus, the workpiece having opposite first and second workpiece sides and first and second workpiece edges, the induction heating apparatus comprising:
- a first coil structure spaced from and facing the first workpiece side and extending between the first and second workpiece edges;
- a second coil structure positioned spaced from and facing the the second workpiece side and extending between the first and second workpiece edges;
- an AC supply operatively coupled with the first coil structure to provide AC current to energize the first coil structure for heating at least a portion of the first workpiece side;
- a plurality of laminations at least partially surrounding a first portion of the first coil structure leaving an unobstructed second portion of the first coil structure facing the first workpiece side, the individual laminations including laminated structures extending along the process direction, the individual laminations parallel to and spaced from an adjacent lamination along a cross-process direction between the first and second workpiece edges;
- windings extending around at least portions of a first set of the plurality of laminations;
- a second plurality of laminations at least partially surrounding a first portion of the second coil structure leaving an unobstructed second portion of the second coil structure facing the second workpiece side;
- second windings extending around at least a portion of a first set of the second plurality of laminations;
- a DC supply coupled with the windings and operative to selectively provide DC current to individual windings to at least partially saturate a magnetic field a magnetic field associated with individual ones of the corresponding laminations of the first set; and
- a controller operatively coupled with the DC supply to control individual DC excitation of the individual windings for selectively saturating the individual ones of the corresponding laminations of the first set to control induction heating of the first and second workpiece edges;
- wherein the AC supply is operatively coupled with the second coil structure to provide AC current to energize the second coil structure for heating at least a portion of the second workpiece side;
- wherein the DC supply is coupled with the second windings and operative to selectively provide DC current to individual second windings to at least partially saturate a magnetic field associated with individual ones of the first set of the second plurality of laminations; and
- wherein the controller is operative to control individual DC excitation of the individual second windings for selectively saturating the individual ones of the first set of the second plurality of laminations to control induction heating of the first and second workpiece edges.

11. The induction heating apparatus of claim 10, wherein the first and second coil structures each form a single turn comprising:
- a first straight portion extending between the first and second workpiece edges;
- a turn portion connected to the first straight portion; and
- a second straight portion connected to the turn portion, the second straight portion extending between the first and second workpiece edges.

12. The induction heating apparatus of claim 11, wherein the first sets of laminations each include at least two laminations facing the first workpiece edge and at least two laminations facing the second workpiece edge.

13. The induction heating apparatus of claim 10, comprising:
- a first flux shield spaced from and disposed between the first coil structure and the first workpiece side facing at least one of the first and second workpiece edges; and
- a second flux shield spaced from and disposed between the second coil structure and the second workpiece side facing at least one of the first and second workpiece edges.

14. The induction heating apparatus of claim 13, wherein the first and second flux shields face at least one of the first sets of the first and second pluralities of laminations.

15. The induction heating apparatus of claim 10, wherein the first sets of laminations each include at least two laminations facing the first workpiece edge and at least two laminations facing the second workpiece edge.

16. The induction heating apparatus of claim 10, comprising at least one flux shield spaced from and disposed between one of the first and second coil structures and the workpiece.

* * * * *